(12) United States Patent
Qian

(10) Patent No.: US 8,412,779 B1
(45) Date of Patent: Apr. 2, 2013

(54) BLOCKING OF UNSOLICITED MESSAGES IN TEXT MESSAGING NETWORKS

(75) Inventor: Haichuan Qian, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 2727 days.

(21) Appl. No.: 11/019,572

(22) Filed: Dec. 21, 2004

(51) Int. Cl.
*G06F 15/16* (2006.01)

(52) U.S. Cl. ............................................. 709/206

(58) Field of Classification Search .............. 709/206
See application file for complete search history.

(56) References Cited

U.S. PATENT DOCUMENTS

| | | | |
|---|---|---|---|
| 5,892,900 A | 4/1999 | Ginter et al. | |
| 6,658,568 B1 | 12/2003 | Ginter et al. | |
| 6,799,033 B2 | 9/2004 | Kanefsky | |
| 6,801,766 B1 | 10/2004 | Buchanan et al. | |
| 6,801,781 B1 | 10/2004 | Provost et al. | |
| 6,804,509 B1 | 10/2004 | Okon et al. | |
| 6,807,168 B2 | 10/2004 | Daly et al. | |
| 6,807,255 B1 | 10/2004 | Alston et al. | |
| 6,807,431 B2 | 10/2004 | Sayers et al. | |
| 6,807,565 B1 | 10/2004 | Dodrill et al. | |
| 7,317,697 B2* | 1/2008 | Lewis et al. .................. | 370/312 |
| 2002/0160805 A1* | 10/2002 | Laitinen et al. ............... | 455/550 |
| 2004/0019645 A1* | 1/2004 | Goodman et al. ............ | 709/206 |
| 2004/0196858 A1 | 10/2004 | Tsai et al. | |
| 2004/0203589 A1 | 10/2004 | Wang et al. | |
| 2004/0209597 A1 | 10/2004 | Myles et al. | |
| 2004/0209640 A1 | 10/2004 | Urban et al. | |
| 2004/0210565 A1 | 10/2004 | Lu et al. | |
| 2004/0210661 A1 | 10/2004 | Thompson et al. | |
| 2004/0210927 A1 | 10/2004 | Bahr et al. | |
| 2006/0026242 A1* | 2/2006 | Kuhlmann et al. ........... | 709/206 |

OTHER PUBLICATIONS

California Software Laboratories, SMS (Short Message Service)—Technical Overview—Whitepapers: California Software, pp. 1-12; Retrieved on Oct. 25, 2004; Retrieved from the internet: <URL:http://www.cswl.com/shiteppr/tech/sms.html>.

* cited by examiner

*Primary Examiner* — Boris Gorney
(74) *Attorney, Agent, or Firm* — Okamoto & Benedicto LLP

(57) ABSTRACT

In one embodiment, a subscriber who receives a spam message in his or her wireless mobile device may forward the message to a designated server for potential blocking. The message may be forwarded to the server using a designated phone number, for example. At the server, a learning module may verify if the message is indeed spam based at least on reports from other subscribers. If the message is spam, the server may initiate blocking of same or similar messages. For example, the server may report the spam message to a message service center, which may then block transmission of same or similar messages to all subscribers. The wireless mobile device may be a mobile telephone, for example.

20 Claims, 3 Drawing Sheets

BLOCKING OF UNSOLICITED MESSAGES IN TEXT MESSAGING NETWORKS

BACKGROUND OF THE INVENTION

1. Field of the Invention

The present invention relates generally to text messaging networks, and more particularly but not exclusively to techniques for blocking unsolicited text messages.

2. Description of the Background Art

Problems associated with unsolicited messages in e-mail systems are well documented. Unsolicited messages, also referred to as "spam," are mass mailed by spammers to e-mail accounts over the Internet. Various anti-spam software have been developed to combat spam. In the case of general purpose computers, deployment of anti-spam software is relatively straightforward given the computing power of today's computers.

Short Message Service (SMS) and Multimedia Media Service are examples of text messaging services available to mobile wireless devices, such as mobile telephones. These messaging services allow a subscriber to receive text and/or multimedia messages instead of a voice call from a live person. Like in e-mail systems, spammers have been sending spam messages to mobile wireless devices. Unfortunately, most mobile wireless devices do not have the computing power of general purpose computers, such as laptop and desktop computers. This makes most wireless devices incapable of running full featured anti-spam software in the devices themselves.

SUMMARY

In one embodiment, a subscriber who receives a spam message in his or her wireless mobile device may forward the message to a designated server for potential blocking. The message may be forwarded to the server using a designated phone number, for example. At the server, a learning module may verify if the message is indeed spam based at least on reports from other subscribers. If the message is spam, the server may initiate blocking of same or similar messages. For example, the server may report the spam message to a message service center, which may then block transmission of same or similar messages to all subscribers. The wireless mobile device may be a mobile telephone, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
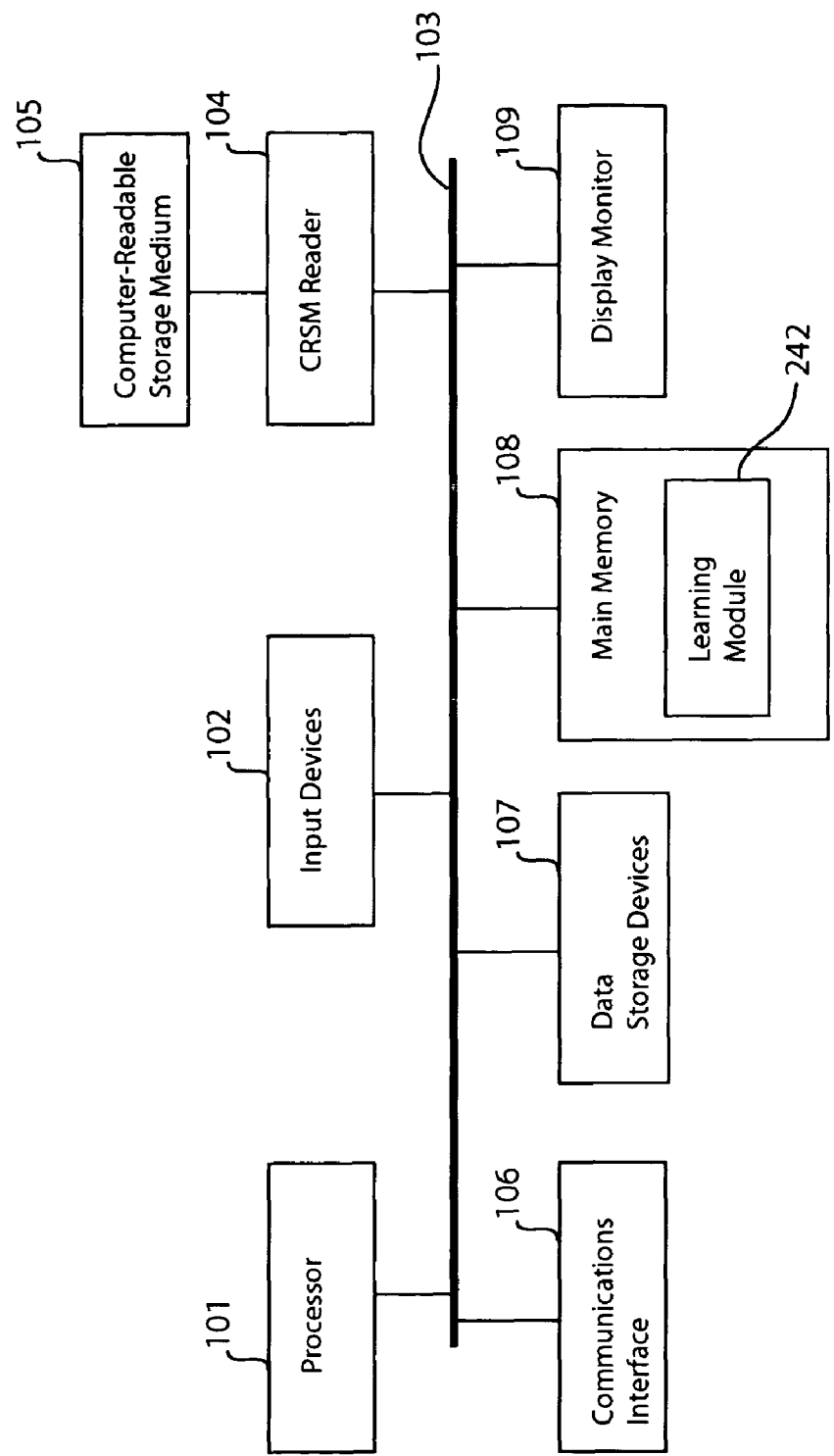
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a desktop computer, a server computer, or an appliance, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes a learning module 242. The learning module 242 may be executed by processor 101.

Figure 2:
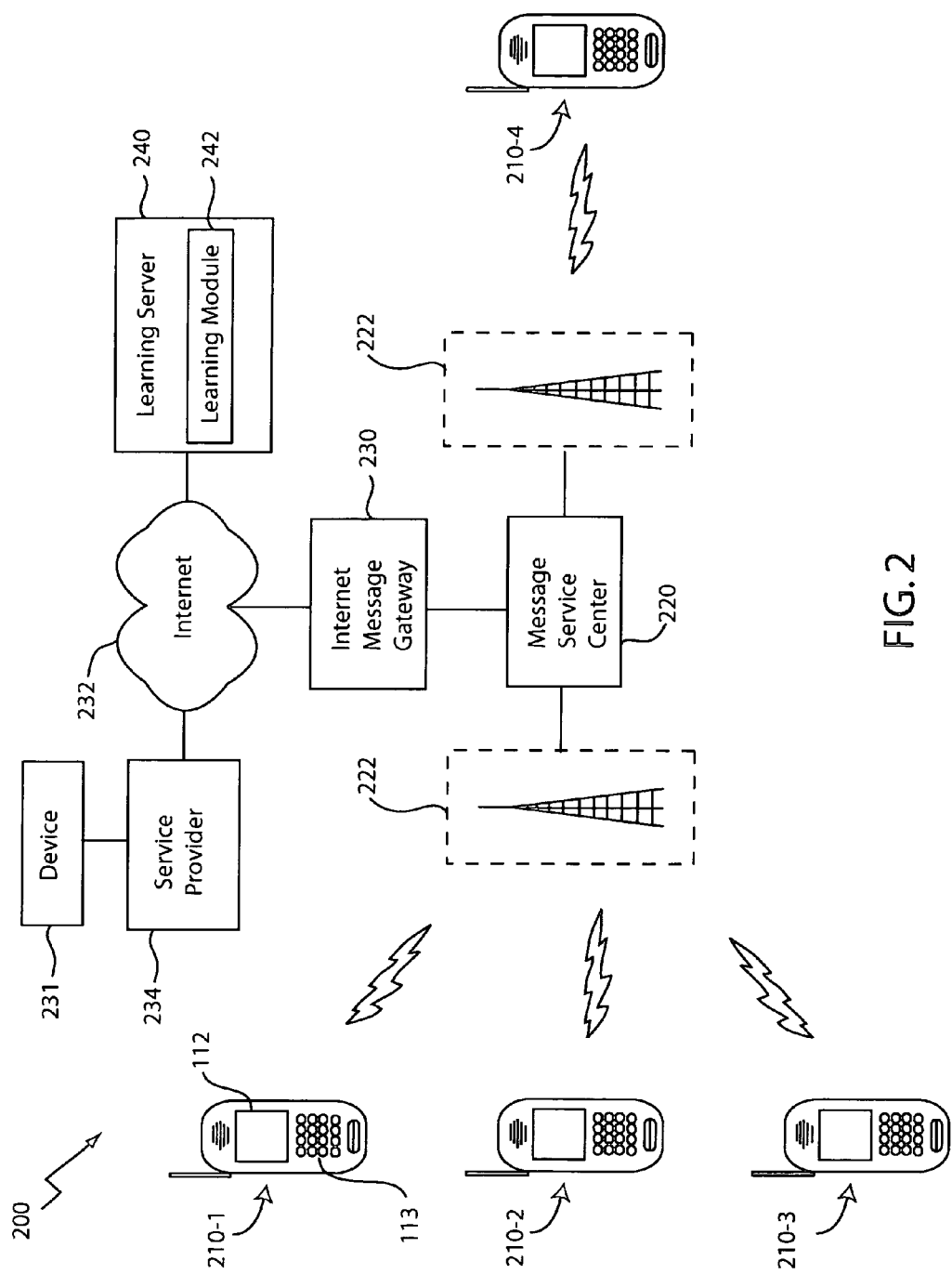
FIG. 2 schematically illustrates a text messaging network in accordance with an embodiment of the present invention.

FIG. 2 schematically illustrates a text messaging network 200 in accordance with an embodiment of the present invention. Note that components not necessary to the understanding of the invention, such as relays between wireless networks, have been omitted in the interest of clarity. The text messaging network 200 may include a plurality of mobile wireless devices, which are mobile telephones 210 (i.e., 210-1, 210-2, . . . ) in this example. Referring to mobile telephone 210-1, a mobile telephone 210 may have a keypad 113 for entering texts or dialing telephone numbers, and a display screen 112 for displaying visual information, such as texts, graphics, etc.

The mobile telephones 210 communicate over a wireless communications network 222. For example, a subscriber using a mobile telephone 210-4 may place a call over the wireless communications network 222 to speak (i.e., by voice) to another subscriber using a mobile telephone 210-1. The mobile telephones 210 may also receive a call over other wireless communications networks, a wired public switched telephone network (PSTN), the Internet (e.g., voice over IP), etc.

Text messaging remains a popular means of communication between mobile telephone users. Accordingly, the text messaging network 200 may include a message service center 220 coupled to the wireless communications network 222. The message service center 220 provides a messaging service, such as Short Message Service (SMS) and/or Multimedia Message Service (MMS), to the mobile telephones 210. For example, the message service center 220 may be a Short Message Service Center (SMSC) or a Multimedia Message Service Center (MMSC). As is well known, Short Message Service and Multimedia Message Service allow text messages to be received in mobile telephones. Multimedia Message Service further allows for inclusion of image, video, and/or audio in a text message.

The message service center 220 may communicate with the mobile telephones 210 over the wireless network 222. For example, a first subscriber may compose a text message using the keypads of his mobile telephone 210. The first subscriber may then transmit the text message to a second subscriber. The message service center 220 may receive the text message from the first subscriber, locate the second subscriber, and forward the text message to the second subscriber if her mobile telephone 210 is available to receive the text message. Once the mobile telephone 210 of the second subscriber receives the text message, the second subscriber may view the text message on the display screen 112 of her mobile telephone 210.

The message service center 220 may be coupled to an Internet message gateway 230. The Internet message gateway 230 allows the mobile telephones 210 to receive text messages over the Internet (labeled as 232). The Internet message gateway 230 may be an Internet Short Message Gateway (ISMG), for example. A service provider 234 allows a device 231 (e.g., general purpose computer, a wired or wireless telephone) to send a text message to a mobile telephone 210 over the Internet. For example, the device 231 may send a text message to a mobile telephone 210 along a communications path that includes the service provider 234, the Internet, the Internet message gateway 230, the message service center 220, and wireless communications network 222.

Like in e-mail systems, spammers are taking advantage of the relative ease of sending spam messages by text messaging. These spam messages are usually unsolicited advertisements for various products, causes, etc. Because wireless mobile devices, such as mobile telephones, typically don't have the computing power of a general purpose computer, a wireless mobile device may not be capable of running an anti-spam software in the device itself. One solution to this problem is to provide each subscriber a "black list." The message center may determine the source of a text message, and block the text message at the message center if the source is listed in the black list of the particular subscriber. However, this approach only works on an individual subscriber basis. Furthermore, text message sources listed in the black list of an individual subscriber may or may not be spammers in the first place. A subscriber may add a text message source in his black list for a variety of reasons, including if the subscriber simply does not want to receive text messages from a particular person (who may not be a spammer).

To prevent spam text messages from being received in the mobile telephones 210, text messaging network 200 may include a learning server 240. The learning server 240 may comprise a server computer, such as those available from Hewlett-Packard or Sun Microsystems, for example. The learning server 240 may be coupled to the Internet to communicate with the message service center 220 by way of the Internet Message Gateway 230. The learning server 240 may also be in an Intranet of a wireless telephone operator.

In one embodiment, the learning server 240 includes a learning module 242. The learning module 242 may comprise computer-readable program code for receiving spam reports from the mobile telephones 210 and verifying the accuracy of spam reports. A spam report may comprise a text message that a subscriber believes is spam. Upon receiving a text message that the subscriber deems spam, the subscriber may forward the text message to the learning server 240. The subscriber may do so by forwarding the text message to a designated phone number, also referred to as "spam reporting phone number," assigned to the learning server 240. The learning server 240 may assume that text messages received through the spam reporting phone number are suspected spam messages reported by subscribers. The learning module 242 may verify if a reported text message is spam based at least on reports from other subscribers. For example, if several subscribers reported a particular text message as spam, the learning module 242 may deem that text message as spam. The learning module 242 may then initiate blocking of that text message to prevent it from being delivered to several or all of mobile telephones 210. For example, the learning module 242 may inform the message service center 220 to block the same text message to prevent delivery to the mobile telephones 210. If the mobile telephones 210 have the capability to block certain calls by caller ID, the learning module 242 may upload the caller ID of the text message to the mobile telephones 210. Blocking of spam at the mobile telephones 210 by caller ID advantageously does not require substantial computing power. Other ways of blocking spam once it is verified may also be employed without detracting from the merits of the present invention.

In the example of FIG. 2, the learning server 240 is depicted as being separate from the message service center 220. This advantageously allows companies other than telephone companies (e.g., provider of wireless telephone service, text messaging service) to provide anti-spam solutions. For example, the learning server 240 may be implemented and run by a non-telephone company, such as an anti-virus company (e.g., Trend Micro, Incorporated). This allows telephone companies to provide anti-spam solutions to their subscribers without having to setup their own anti-spam infrastructure. In other embodiments, the functionalities of the learning server 240, including the learning module 242, are integrated with the message service center 220.

Figure 3:
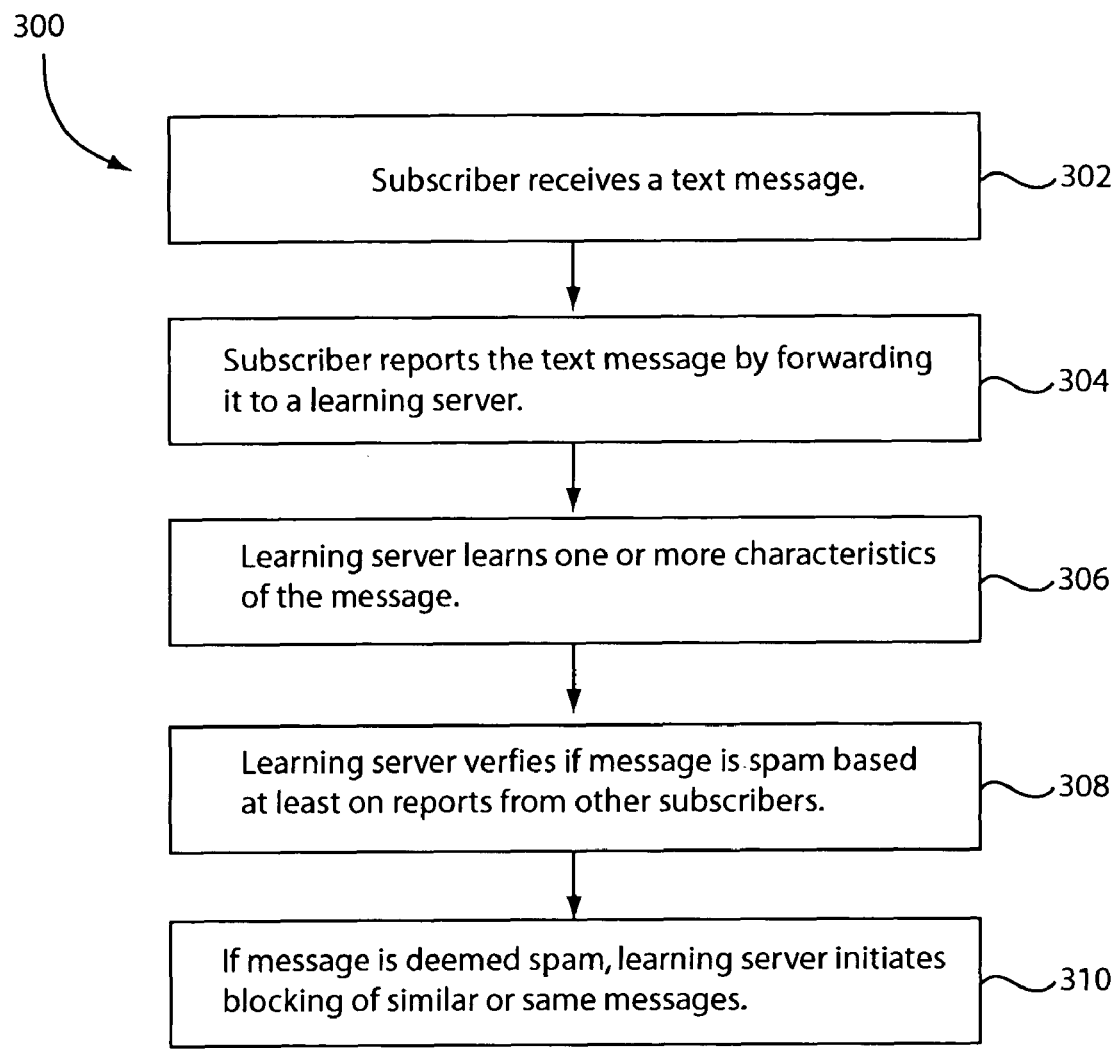
FIG. 3 shows a flow diagram of a method of blocking spam messages in a text messaging network, in accordance with an embodiment of the present invention.

FIG. 3 shows a flow diagram of a method 300 of blocking spam messages in a text messaging network, in accordance with an embodiment of the present invention. In one embodiment, the method 300 is implemented as computer-readable program code executed by one or more processors at a computer server. As can be appreciated, the method 300 may also be implemented in firmware or hardware (e.g., ASIC, FPGA), for example.

In step 302, a subscriber receives a text message in a mobile telephone. The text message may be delivered to the subscriber as part of a Short Message Service (SMS) or Multimedia Message Service (MMS), for example.

In step 304, the subscriber may report the text message if the subscriber deems the text message as spam. The subscriber may report the text message by forwarding it to a learning server. For example, the subscriber may report the text message by forwarding it to a spam reporting phone number of the learning server. The spam reporting phone number may be managed by an operator, who can then enter the report into the learning server. The subscriber may be given incentives to report a suspected spam. For example, the subscriber may be given extra calling minutes, discounts to phone services, and the like after the reported text message is verified as spam.

In step 306, the learning server learns one or more characteristics of the text message. The characteristic of the text message may be used as a signature for comparison and identification purposes. The characteristic of the text message may be its entire content, portions of its content (e.g., number and presence of particular words), caller ID of the device that transmitted the text message to the subscriber, the checksum of the text message, and the like.

In step 308, the learning server verifies if the reported text message is spam based at least on reports from other subscribers. For example, the learning server may count the number of subscribers who reported the same or similar (e.g., based on learned characteristic) text message. If the count is greater than a threshold number, the reported text message may be deemed as spam. Using reports from several subscribers to identify spam increases the probability that the text message is indeed spam, thereby decreasing false positives.

In step 310, the learning server initiates blocking of text messages that are similar to or the same as the text message verified as spam ("spam text message"). For example, the learning server may forward the spam text message and/or its characteristic to a message service center. At the message service center, text messages that are similar to the spam text message may be prevented from being delivered to several or all subscribers. For example, the message service center may block all text messages having the same caller ID, checksum, and/or content as the spam text message.

The learning server may also forward the spam text message and/or its characteristic to individual mobile telephones. To minimize use of the computing resources of mobile telephones, a relative easy to match characteristic of the spam text message may be provided to the mobile telephones. For example, the mobile telephones may block all text messages having the same caller ID as the spam text message without having to scan an entire text message.

An improved method and system for blocking spam messages in a text messaging network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of blocking spam messages in a text messaging network, the method comprising:
   receiving a report of a text message, the report being initiated by a subscriber who received the text message in a mobile telephone;
   verifying if the text message is spam based at least on reports from other subscribers; and
   if the text message is verified as spam, preventing other text messages having a same characteristic as the text message from being received in other mobile telephones.

2. The method of claim 1 wherein the text message is received as part of a messaging service selected from a group consisting of Short Message Service (SMS) and Multimedia Message Service (MMS).

3. The method of claim 1 wherein the subscriber reports the text message by forwarding the text message to a designated phone number.

4. The method of claim 1 wherein verifying if the text message is spam comprises:
   determining if a number of subscribers who reported the text message as spam is greater than a threshold number.

5. The method of claim 1 wherein the characteristic includes a caller ID of a device that initiated transmission of the text message to the mobile telephone.

6. The method of claim 1 wherein preventing other text messages having a same characteristic as the text message from being received in other mobile telephones comprises:
   informing a message service center providing a messaging service to mobile telephones that the text message is spam.

7. The method of claim 1 wherein preventing other text messages having a same characteristic as the text message from being received in other mobile telephones comprises:
   providing a caller ID of a device that initiated transmission of the text message to the mobile telephone of the subscriber; and
   using the caller ID to block messages in the mobile telephone.

8. A system for blocking spam messages in a communications network, the system comprising:
   a plurality of mobile devices coupled to a wireless communications network;
   a message service center coupled to the wireless communications network, the message service center providing a messaging service to the plurality of mobile devices;
   an Internet message gateway coupling the message service center to the Internet; and
   a learning server coupled to the Internet message gateway, the learning server being configured to verify if a message received from a mobile device is a spam message based at least on reports from other mobile devices.

9. The system of claim 8 wherein the learning server is further configured to determine a characteristic of the message.

10. The system of claim 8 wherein the characteristic comprises a caller ID.

11. The system of claim 8 wherein the plurality of mobile devices comprises mobile telephones.

12. The system of claim 8 wherein the messaging service comprises a text messaging service.

13. The system of claim 8 wherein the messaging service comprises a Short Message Service (SMS).

14. A method of blocking spam messages in a text messaging network, the method comprising:
   receiving a text message in a mobile telephone;
   dialing a predetermined telephone number to report the text message to a computer server;
   at the computer server, determining if the text message is spam based at least on reports received from other mobile telephones; and
   if the text message is verified as spam, preventing text messages having a same characteristic as the text message from being received in other mobile telephones.

15. The method of claim 14 wherein the characteristic comprises a caller ID.

16. The method of claim 14 wherein the characteristic comprises a content of the text message.

17. The method of claim 14 wherein the text message is received in the mobile telephone as part of a Short Message Service (SMS).

18. The method of claim 14 wherein the text message is received in the mobile telephone as part of a Multimedia Message Service (MMS).

19. The method of claim 14 wherein the computer server receives a report from the mobile telephone over the Internet.

20. The method of claim 14 wherein preventing text messages having the same characteristic as the text message comprises:
   informing a message service center that the text message is spam.

* * * * *